United States Patent

[11] 3,624,180

[72] Inventors Rolf Schmid
Florastrasse 7, Reinach, Basel-Land;
Friedrich Lohse, Lilienstrasse 39,
Allschwil; Willy Fisch, Hoelzlistrasse 42,
Binningen; Hans Batzer, Rainwig 7,
Arlesheim, all of Switzerland
[21] Appl. No. 845,917
[22] Filed July 29, 1969
[45] Patented Nov. 30, 1971
[32] Priority Aug. 7, 1968
[33] Switzerland
[31] 11847/68

[54] HEAT-CURABLE COMPOSITIONS OF MATTER
17 Claims, No Drawings

[52] U.S. Cl. ........................................... 260/835,
260/22 EP, 260/28, 260/32.8 EP, 260/33.2 EP,
260/33.4 EP, 260/33.6 EP, 260/40 R, 260/75 EP,
260/830 TW, 260/836
[51] Int. Cl. .............................................. C08g 45/14
[50] Field of Search ............................................. 260/835, 75 EP

[56] References Cited
UNITED STATES PATENTS

| | | | |
|---|---|---|---|
| 3,027,279 | 3/1962 | Kurka et al. | 260/835 |
| 3,280,077 | 10/1966 | Case et al. | 260/835 |
| 3,408,421 | 10/1968 | Kurka | 260/835 |
| 3,427,255 | 2/1969 | Case | 260/835 |
| 3,523,143 | 8/1970 | Kwong | 260/835 |

*Primary Examiner*—John C. Bleutge
*Attorneys*—Harry Goldsmith, Joseph G. Kolodny and Mario A. Monaco ABSTRACT: Heat-curable epoxide resin mixtures from (1) a polyepoxide with at least one carbocyclic or heterocyclic ring (e.g. ARALDIT CY 175, triglycidylisocyanurate or casting resin F), (2) a polyester containing at least one carbocyclic or heterocyclic ring with terminal carboxyl groups; the ratio of the total chain members $Z_g$ to the ring members $Z_r$ must be 2 to 13, and the chain contains 2 to 10 recurring structural elements (e.g. polyesters from phthalic acid anhydride and ethyleneglycol 11:10 or from succinic acid and 1,1-bis-(hydroxymethyl)cyclohexane 5:4) in a quantity of 0.2–0.8 equivalent per 1 epoxide equivalent and (3) a polycarboxylic acid anhydride (phthalic acid anhydride, hexahydrophthalic acid anhydride) containing a carbocyclic ring in a quantity of 0.8 to 0.2 equivalent per 1 epoxide equivalent. Cured shaped articles have unexpectedly high tensile strength (to over 900 kg./cm$^2$) and show after gelling very slight shrinkage.

HEAT-CURABLE COMPOSITIONS OF MATTER

The subject of the present invention are heat-curable epoxide resin mixtures modified by addition of polyester, which are suitable for use as casting, impregnating and laminating resins and as adhesives, coatings and compression moulding compositions, characterized in that they contain (1) a polyepoxide compound with at least one carbocyclic or heterocyclic ring; (2) a polycarboxylic acid anhydride with at least one carbocyclic ring in an amount of 0.8 to 0.2 equivalents, preferably 0.7 to 0.45 equivalents, per 1 epoxide equivalent of the polyepoxide compound (1) and (3) an acid polyester containing carbocyclic or heterocyclic rings, of formula

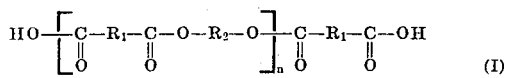

in an amount of 0.2 to 0.8 equivalents, preferably 0.3 to 0.55 equivalents, per 1 epoxide equivalent of the polyepoxide compound (1), and where, in formula (I), the symbols $R_1$ and $R_2$ in the recurring structural element denote divalent aliphatic, araliphatic, cycloaliphatic, cycloaliphatic-aliphatic, aromatic or heterocyclic residues, with at least one of the two residues $R_1$ and $R_2$ having to contain a carbocyclic or heterocyclic ring or ring system, $n$ denotes an integer having a value of 2 to 10, preferably 2 to 5, and, further, the quotient $Z_g/Z_r$ in the recurring structural element of formula

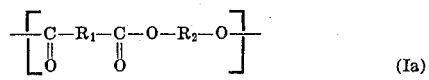

possesses a value of 2 to 13, preferably 4 to 10, wherein $Z_g$ denotes the total number of members in the straight chain of the structural element and $Z_r$ the number of members of the structural element consisting of a ring or ring system, with the former members being selected from the following group:

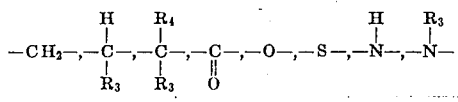

($R_3$ and $R_4$ each denote an alkyl group or alkenyl group), and alicyclic, heterocyclic and aromatic rings or condensed or anellated ring systems, but where ring systems in which two rings are linked by a common spiro-carbon atom are counted as two ring members.

The curable mixtures according to the invention after curing yield mouldings of high mechanical strength, and in particular, especially surprisingly, high tensile strength values of up to above 900 kg./cm.², such as have hitherto not been observed on unstretched cross-linked plastics. The fact that on hot curing of the mixture the greatest part of the total shrinkage occurs before gelling is furthermore of particularly great practical importance. This is a considerable advantage especially for uses in the casting resin field, for example when potting metallic components, since when using the curable mixtures according to the invention much slighter shrinkage stresses arise after gelling than in the case of conventional casting resin mixtures. The cured mouldings are furthermore distinguished by good dielectric properties.

Possible polyepoxide compounds (1) are especially those with an alicyclic or cycloaliphatic or a N-heterocyclic ring or ring system. The hot-curable mixtures according to the invention, which are derived from such polyepoxides, are particularly advantageous for the manufacture of weathering-resistant insulators, since the mouldings manufactured therefrom are resistant to tracking discharges and arcing stresses, that is to say do not form any conducting tracks.

Epoxide resins with at least one epoxide group located in an alicyclic five-membered or six-membered ring are particularly suitable.

The following may be mentioned as cycloaliphatic polyepoxide compounds with at least one six-membered ring to which a 1,2-epoxide group is bonded:

Limonene diepoxide, vinylcyclohexene diepoxide, cyclohexadiene diepoxide; bis(3,4-epoxycyclohexyl)dimethylmethane.

Epoxycyclohexylmethyl ethers of glycols or oxyalkylene glycols such as diethylene glycol-bis(3,4-epoxy-6-methylcyclohexylmethyl) ether; ethylene glycol-bis(3,4-epoxycyclohexylmethyl) ether, 1,4-butanedidiol-bis(3',4'-epoxycyclohexylmethyl) ether; (3,4-epoxycyclohexylmethyl)glycidyl ether; (3,4-epoxycyclohexyl)glycidyl ether, ethylene glycol-bis(3,4-epoxycyclohexyl) ether, 1,4-butanediol-bis(3',4'-epoxycyclohexyl) ether, p-hydroxyphenyldimethylmethane-bis(3,4-epoxycyclohexyl) ether; bis(3,4-epoxycyclohexyl) ether; (3',4'-epoxycyclohexylmethyl)-3,4-epoxycyclohexyl ether; 3,4-epoxycyclohexane-1,1-dimethanol-diglycidyl ether.

Epoxycyclohexane-1,2-dicarboximides, such as N, N'-ethylenediamine-bis(4,5-epoxycyclohexane-1,2-dicarboximide); epoxycyclohexylmethyl-carbamates such as bis(3,4-epoxycyclohexylmethyl)-1,3-toluylene-dicarbamate.

Epoxycyclohexanecarboxylates of aliphatic polyols, such as 3-methyl-1,5-pentanediol-bis(3,4-epoxycyclohexanecarboxylate), 1,5-pentanediol-bis(3,4-epoxycyclohexanecarboxylate), ethylene glycol-bis(3,4-epoxycyclohexanecarboxylate), 2,2-diethyl-1,3-propanediol-bis(3',4'-epoxycyclohexane carboxylate), 1,6-hexanediol-bis(3',4'-epoxycyclohexanecarboxylate), 2-butene-1,4-diol-bis(3',4'-epoxycyclohexanecarboxylate), 2-butene-1,4-diol-bis(3',4'-epoxy-6-methylcyclohexanecarboxylate), 1,1,1-trimethylolpropane-tris-(3',4'-epoxycyclohexanecarboxylate), 1,2,3-propanetriol-tris(3', 4'-epoxycyclohexanecarboxylate); epoxycyclohexanecarboxylates of oxyalkylene glycols such as diethylene glycol-bis(3,4-epoxy-6-methylchlohexanecarboxylate), triethylene glycol-bis(3,4-epoxycyclohexanecarboxylate).

Epoxycyclohexylalkyl-dicarboxylic acid esters, such as bis(3,4-epoxycyclohexylmethyl)maleate, bis(3,4-epoxycyclohexylmethyl)oxalate, bis(3,4-epoxycyclohexylmethyl)pimelate, bis(3,4-epoxy-6-methylcyclohexylmethyl)succinate, bis(3,4-epoxycyclohexylmethyl)adipate, bis(3,4-epoxy-6-methylcyclohexylmethyl)adipate, bis(3,4-epoxy-6-methylcyclohexylmethyl)-sebacate, bis(3,4-epoxycyclohexylmethyl)terephthalate, bis-(3,4-epoxy-6-methylcyclohexylmethyl)terephthalate.

Epoxycyclohexylcarboxylic acid esters, such as bis(3,4-epoxycyclohexyl)succinate, bis(3,4-epoxycyclohexyl)adipate, bis(3,4-epoxycyclohexyl)carbonate, (3',4'-epoxycyclohexyl)-3,4-epoxycyclohexanecarboxylate, 3',4'-epoxycyclohexylmethyl-9,10-epoxystearate; 2', 2''-sulphonyldiethanol-bis(3,4-epoxycyclohexanecarboxylate); bis(3,4-epoxycyclohexylmethyl)-carbonate.

Further compounds to be particularly mentioned are the 3,4-epoxycyclohexanecarboxylates of 3,4-epoxycyclohexylmethanols, such as for example 3',4'-epoxy-2'-methylcyclohexylmethyl)-3,4-epoxy-2-methylcyclohexanecarboxylate, (1'-chlor-3',4'-epoxycyclohexyl)-1-chlor-3,4-epoxycyclohexanecarboxylate, (1'-brom-3',4'-epoxycyclohexylmethyl)-1-brom-3,4-epoxycyclohexanecarboxylate, and amongst those which are particularly suitable, for example those of formulas:

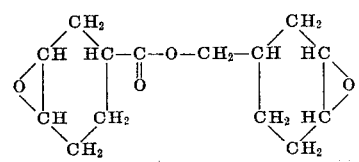

(=3',4'-Epoxycyclohexylmethyl-3,4-epoxycyclohexanecarboxylate),

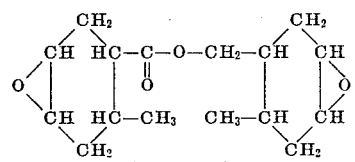

(=3',4'-Epoxy-6'-methylcyclohexylmethyl-3,4-epoxy-6-methylcyclohexanecarboxylate); acetals and ketals with epoxycyclohexane groups such as 3,4-epoxy-6-methylcyclohexanecarboxaldehyde-bis(3,4-epoxy-6-methylcyclohexylmethyl)acetal; bis(3,4-epoxycyclohexylmethyl)-formal, bis(3,4-epoxy-6-methylcyclohexylmethyl)formal; benzaldehyde-bis(3,4-epoxycyclohexylmethyl)acetal, acetaldehyde-bis(3,4-epoxycyclohexylmethyl)acetal, acetone-bis(3,4-epoxycyclohexylmethyl)ketal, glyoxal-tetrakis(3,4-epoxycyclohexylmethyl)acetal; bis(3,4-epoxyhexahydrobenzal)-D-sorbitol; bis(3,4-epoxyhexahydrobenzal)pentaerythritol (=3,9-bis-(3,4-epoxycyclohexyl)spirobi(metadioxane)), bis(3,4-epoxy-6-methylhexahydrobenzal)pentaerythritol; 3-(3',4'-epoxycyclohexylmethyl-oxyethyl)-2,4-dioxaspiro(5.5)-8,9-epoxyundecane, 3-(3',4'-epoxycyclohexylmethyloxy-(2')propyl)-2,4-dioxaspiro(5.5)-8,9-epoxyundecane; 3,9-bis(3',4'-epoxycyclohexylmethyloxyethyl)spirobi-(m-dioxane); 3-(2',3'-epoxypropyloxyethyl)-2,4-dioxaspiro(5.5)-8,9-epoxyundecane, 3-(glycidyloxyethoxyethyl)-2,4-dioxaspiro(5.5)-8,9-epoxyundecane; ethylene glycol-bis-2'(2,4-dioxaspiro[5.5]-8,9-epoxyundecyl-3)ethylether, polyethylene glycol-bis-2'(2,45.5)-8,9-epoxyundecyl-3)ethyl ether, 1,4-butanediol-bis-2'(2,4-dioxaspiro(5.5)-8,9-epoxyundecyl-3)ethyl ether, trans-quinitol-bis-(5.5)-8,9-epoxyundecyl-3)ethyl ether, trans-quintol-bis-2'(2,4-dioxaspiro-(5.5)-8,9-epoxyundecyl-3)ethyl ether, bis-(2,4-dioxaspiro(5.5)-8,9-epoxyundecyl-3)-ether, 3,4-epoxyhexahydrobenzaldehyde(1'-glycidyloxyglycerine-2',3')acetal and, amongst those which are particularly suitable, for example those of formulas:

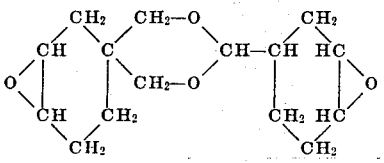

(3-(3',4'-epoxycyclohexyl)-8,9-epoxy-2,4-dioxaspiro[5.5]-undecane) and of formula

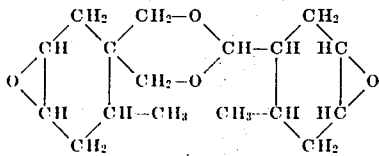

(3-(3',4'-Epoxy-6'-methylcyclohexyl)-8,9-epoxy-7-methyl-2,4-dioxaspiro[5.5]undecane).

As cycloaliphatic polyepoxide compounds with at least one five-membered ring to which a 1,2-epoxide group is bonded, there may be mentioned: dicyclopentadiene diepoxide, glycidyl-2,3-epoxycyclopentyl ether, bis-(2,3-epoxycyclopentyl)ether, 2,3-epoxybutyl-2,3-epoxycyclopentyl ether, epoxypentyl-2,3-epoxycyclopentyl ether, 9,10-epoxystearyl-2,3-cyclopentyl ether, 3,4-epoxycyclohexylmethyl-2,3-cyclopentyl ether, 2,2,5,5-tetramethyl-3,4-epoxycyclohexylmethyl-2,3-cyclopentyl ether, 2,2,5,5,6-pentamethyl-3,4-epoxycyclohexylmethyl-2,3-epoxycyclopentyl ether; 2,3-epoxycyclopentyl-9,10-epoxystearate, 2,3-epoxycyclopentyl-3,4-epoxy-cyclohexylcarboxylate 2,3-epoxycyclopentyl-2,2,5,5-tetramethyl-3,4-epoxycyclohexylcarboxylate; (3,4-epoxy-2,5-endomethylene-cyclohexylmethyl)-3,4-epoxy-2,5-endomethylenecyclohexanecarboxylate, bis(3,4-epoxy-2,5-endomethylenecyclohexylmethyl)succinate; bis(3,4-epoxy-2,5-endomethylenecyclohexylmethyl)formal, bis(3,4-epoxy-2,5-endomethylenehexahydrobenzal)pentaerythritol, 3-(3',4'-epoxy-2',5'-endomethylenecyclohexylmethyl)-8,9-epoxy-2,4-dioxaspiro(5.5)-undecane; bis(3-oxatricyclo[3.2.1.0²,⁴]-oct-6yl)carbonate, bis(3-oxatricyclo[3.2.1.0²,⁴]-oct-6yl)succinate, (3-oxatricyclo[3.2.1.0²,⁴]-oct-6-yl)-3,4-epoxycyclohexylcarboxylate, (3-oxatricyclo[3.2.1.0²,⁴]oct-6-yl)-9,10-epoxyoctadecanoate; further, especially, epoxydised ethers and esters of dihydrodicyclopentadien-8-ol, such as (4-oxatetracyclo[6.2.1.0²,⁷-0³,⁵]hendec-9-yl)glycidyl ether, (4-oxatetracyclo[6.2.1.0²,⁷-0³,⁵]hendec-9-yl)-2,3-epoxybutyl ether, (4-oxatetracyclo-[6.2.1.0²,⁷0³,⁵]hendec-9yl)-6-methyl-3,4-epoxycyclohexylmethyl ether, (4-oxatetracyclo[6.2.1.0²,⁷0³,⁵]hendec-9-yl)-3,4-epoxycyclohexyl ether, (4-oxatetra-cyclo-[6.2.1.0²,⁷0³,⁵]hendec-9-yl)-3-oxatricyclo(3.2.1.0²,⁴)-oct-6-yl ether, (4-oxatetracyclo[6.2.1.0²,⁷0³,⁵]hendec-9-yl)-3,4-epoxy-2,5-endomethylene-cyclohexylmethyl)ether;
ethylene glycol-bis(4-oxatetracyclo[6.2.1.0²,⁷0³,⁵]hendec-9-yl)-3,4-epoxy-2,5endomethylene-cyclohexylmethyl)ether;
ethylene glycol-bis(4-oxatetracyclo[6.2.1.0²,⁷0³,⁵]hendec-9-yl)ether, diethylene glycol-bis(4-oxatetracyclo[6.2.1.0²,⁷0³,⁵]hendec-9-yl)ether, 1,3-propylene glycol-bis(4-oxatetracyclo[6.2.1.0²,⁷0³,⁵]-hendec-9-yl)ether, glycerine-bis(4-oxatetracyclo[6.2.1.0²,⁷0³,⁵]hendec-9-yl)ehter; bis(4-oxatetracyclo[6.2.1.0²,⁷0³,⁵]hendec-9-yl)ether; bis(4-oxatetracyclo[6.2.1.0²,⁷0³,⁵]hendec-9 -yl)formal; bis(4-oxatetracyclo[6.2.1.0²,⁷0³,⁵]hendec-9-yl)succinate; bis(4-oxatetracyclo[6.2.1.0²,⁷0³,⁵]hendec-9yl)maleate; bis(4-oxatetracyclo[6.2.1.0²,⁷0³,⁵]hendec-9-yl)phthalate; bis(4-oxatetracyclo[6.2.1.0²,⁷0³,⁵]hendec-9-yl)-adipate; bis(4-oxatetracyclo[6.2.1.0²,⁷0³,⁵]hendec-]-yl)sebacate; tris(4-oxatetracyclo[6.2.1.0²,⁷0³,⁵]hendec-9-yl)-trimellitate; 9,10-epoxy-octadecanoicacid[4-oxatetracyclo-(6.2.1.0²,⁷0³,⁵)hendec-9-yl]ester and 9,10,12,13-diepoxyoctadecanoic acid-(4-oxatetracyclo[6.2.1.0²,⁷0³,⁵]hendec-9-yl)ester.

It is also possible to use mixtures of such cycloaliphatic epoxide resins.

As cycloaliphatic polyepoxide compounds which admittedly contain alicyclic ring systems, but in which the epoxide groups occur in alkyl side-chains (above all as glycidyl or β-methylglycidyl groups), the following may be mentioned:

Polyglycidyl esters of hydroaromatic polycarboxylic acids, for example Δ⁴-tetrahydrophthalic acid-diglycidyl ester, 4-methyl-Δ⁴-tetrahydrophthalic acid-diglycidyl ester, hexahydrophthalic acid-diglycidyl ester, 4-methylhexahydrophthalic acid-diglycidyl ester; further, diglycidyl or polyglycidyl ethers and di- or poly-(β-methylglycidyl) ethers of alicyclic alcohols, such as for example the diglycidyl ethers or di-(β-methylglycidyl) ethers of 2,2-bis-(4'-hydroxycyclohexyl)-propane, 1,4-dihydroxychclohexane (quinitol) or Δ³-cyclohexene-1,1-dimethanol.

Possible polyepoxide compounds of the N-heterocyclic series are above all polyglycidyl compounds which contain a nitrogen-containing heterocyclic ring. One such compound is for example 1,3,5-tris-(β-glycidyloxypropionyl)hexahydro-s-triazine of formula

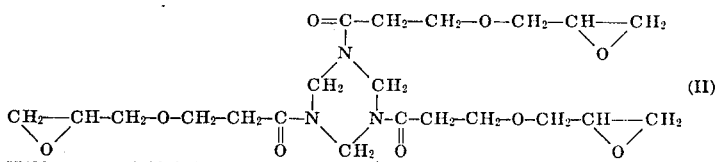

(II)

Preferably, polyglycidyl compounds of the N-heterocyclic series are employed in which the heterocyclic ring exhibits the grouping

at least once, and where the glycidyl groups are directly linked to endocyclic nitrogen atoms. Such polyepoxides are conveniently accessible according to known methods by reactions of epichlorhydrin with heterocyclic urea derivatives, such as especially cyanuric acid, ethyleneurea, hydantoin, substituted hydantoins, bis(hydantoin) compounds, uracil, substituted uracils or bis(dihydrouracil) compounds in the presence of suitable catalysts, for example tertiary amines.

The following may be mentioned: the triglycidylisocyanurate of formula

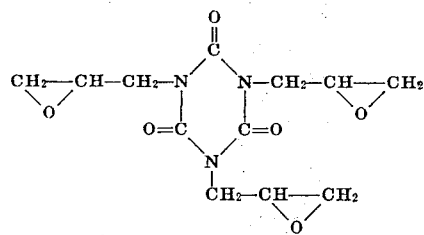

(III)

N,N'-diglycidyl-parabanic acid; N,N'-diglycidyl compounds of formula

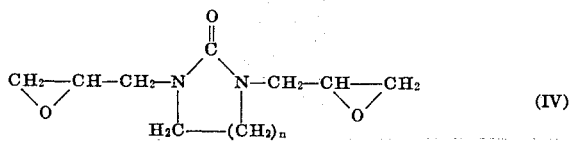

(IV)

wherein $n=1$ or 2, that is to say N,N'-diglycidylpropyleneurea, and above all N,N'-diglycidylethyleneurea(=1,3-diglycidylimidazolidone-2); N,N'-diglycidyl compounds of formula

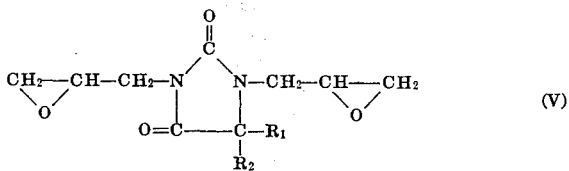

(V)

wherein $R_1$ and $R_2$ each denote a hydrogen atom or a lower alkyl residue with one to four carbon atoms, or wherein $R_1$ and $R_2$ together form a tetramethylene or pentamethylene residue; representatives of this class of compound are for example 1,3-diglycidyl-hydantoin, 1,3-diglycidyl-5-methyl-hydantoin, 1,3-diglycidyl-5-n-propyl-hydantoin, 1,3-diglycidyl-5-methyl-5-ethyl-hydantoin, 1,3-diglycidyl-1,3-diaza-spiro(4.5)-decane-2,4-dione, 1,3-diglycidyl-1,3-diazaspiro(4.4)nonane-2,4-dione and especially 1,3-diglycidyl-5,5-dimethyl-hydantoin as well as 1,3-diglycidyl-5-isopropyl-hydantoin.

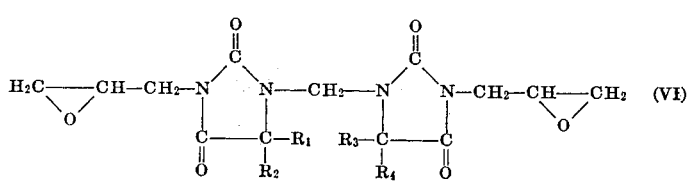

(VI)

wherein $R_1$, $R_2$, $R_3$ and $R_4$ each denote a hydrogen atom or a lower alkyl residue with one to four carbon atoms, or wherein $R_1$ and $R_2$ and/or $R_3$ and $R_4$ together form a tetramethylene or pentamethylene residue; representatives of this class of compounds are for example bis(3-glycidyl-5,5-dimethyl-hydantoinyl-1)methane, bis(3-glycidyl-5-methyl-5-ethyl- hydantoinyl-1)methane and bis(3-glycidyl-5-propyl-hydantoinyl-1)methane.

N,N'-Diglycidyl compounds of formula

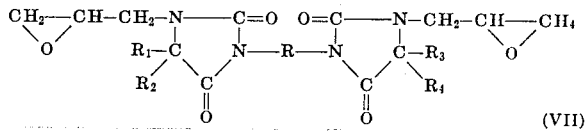

(VII)

wherein R is an aliphatic, cycloaliphatic or araliphatic residue and $R_1$, $R_2$, $R_3$ and $R_4$ each denote a hydrogen atom or a lower alkyl residue with one to four carbon atoms, or wherein $R_1$ and $R_2$ and/or $R_3$ and $R_4$ together form a tetramethylene or pentamethylene residue; representatives of this class of compounds are for example bis(1-glycidyl-5,5-dimethylhydantoinyl-3)methane, 1,2-bis(1-glycidyl-5',5'-dimethylhydantoinyl-3')-ethane, 1,4-bis(1-glycidyl-5,5'-dimethylhydantoinyl-3')-butane, 1,6-bis(1-glycidyl-5,5'-dimethylhydantoinyl-3')hexane, 1,12-bis(1-glycidyl-5',5'-dimethylhydantoinyl-3')dodecane, and $\beta$, $\beta'$-bis(1-glycidyl-5',5'-dimethylhydantoinyl-3')diethyl ether.

N,N'-Diglycidyl compounds of formula

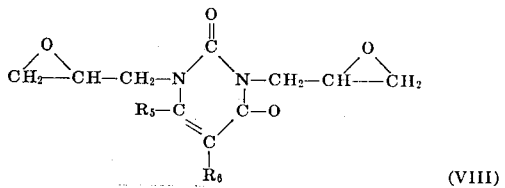

(VIII)

wherein $R_5$ and $R_6$ independently of one another each denote a hydrogen atom or a lower alkyl residue with one to four carbon atoms; representatives of this class of compounds are for example 1,3-diglycidyl-uracil, 1,3-diglycidyl-6-methyl-uracil and 1,3-diglycidyl-5-methyl-uracil.

N,N'-Diglycidyl compounds of formula

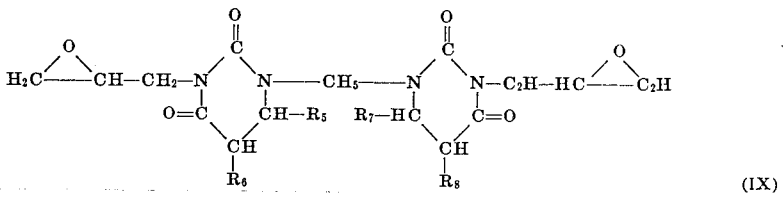

(IX)

wherein $R_5$, $R_6$, $R_7$ and $R_8$ independently of one another each denote a hydrogen atom or a lower alkyl residue with one to four carbon atoms; representatives of this class of compound are for example 3,3'-diglycidyl-1,1'-methylene-bis(5,6-dihydro-uracil) and 3,3'-diglycidyl-1,1'-methylene-bis(6-methyl-5,6-dihydro-uracil).

Of course mixtures of the cycloaliphatic and/or heterocyclic epoxide resins quoted above can also be used.

It is however also possible to use the known classes of polyepoxide compounds or epoxide resins which contain aromatic rings for the manufacture of the curable mixtures according to the invention, for example di- or poly-($\beta$-methylglycidyl) ethers and diglycidyl or polyglycidyl ethers of polyhydric phenols such as resorcinol, bis(p-hydroxyphenyl)methane, 2,2-bis-(p-hydroxyphenyl)propane (=bisphenol A or diomethane), 2,2-bis-(4'-hydroxy-3',5'-dibromophenyl)propane, 1,1,2,2-tetrakis(p-hydroxyphenyl)ethane or condensation products of phenols with formaldehyde obtained under acid conditions, such as phenol novolacs and cresol novolacs.

Polyglycidyl esters and poly-(β-methylglycidyl) esters of polybasic aromatic carboxylic acids such as phthalic acid, isophthalic acid, terephthalic acid, tetrachlorophthalic acid or trimellitic acid.

N-Glycidyl derivatives of aromatic amines such as N,N-diglycidylaniline, N,N-diglycidyltoluidine and N,N,N',N'-tetraglycidyl-bis(p-aminophenyl)methane.

However, above all the advantageous electrical properties of the moulded materials manufactured with such aromatic polyepoxides are as a rule less pronounced than when using the cycloaliphatic or N-heterocyclic polyepoxide compounds mentioned earlier.

The polyesters of formula (I) used for the manufacture of the curable mixtures according to the invention are acid polyesters with two terminal carboxyl groups.

Such polyesters are obtained according to known methods by polycondensation of dicarboxylic acids of formula HOOC—$R_1$—COOH with diols of formula HO—$R_2$—OH; depending on the chosen molar ratio of dicarboxylic acid and diol and the completeness of the condensation reaction, polyesters of differing chain length are obtained. The chain of such polyesters is built up of the alternating building block of the dicarboxylic acid and of the alternating building block of the diol. The recurring structural element, that is to say the smallest recurring chemical grouping in the chain, is represented by the two building blocks, of the dicarboxylic acid and of the diol, linked to one another by an ester bond, and has the formula

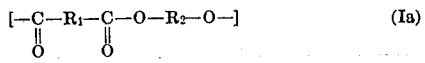
$$[-\overset{\|}{\underset{O}{C}}-R_1-\overset{\|}{\underset{O}{C}}-O-R_2-O-] \quad (Ia)$$

wherein $R_1$ denotes the residue of the dicarboxylic acid and $R_2$ the residue of the diol. At least one of the two building blocks of the structural element must contain a ring, which may be alicyclic, heterocyclic or aromatic, or such a ring must occur at least once in the structural element (Ia). Further, the structural element must fulfill the condition that the quotient $Z_g/Z_r$ is at least 2 and at most 13. $Z_g$ is the total number of members in the straight chain of the structural element (that is to say excluding side chains). The following are counted as single members: methylene groups, methylene groups substituted by alkyl or alkenyl side chains, carbonyl, oxygen bridges, sulfur bridges and nitrogen bridges of amide groups; carbocyclic or heterocyclic rings or ring systems, for example a 1,4-methylene-cyclohexane ring, a cyclohexane ring, a benzene ring or naphthalene ring are counted as a single member. The only exception are spiro-ring systems, for example a spiro(metadioxane) residue of formula

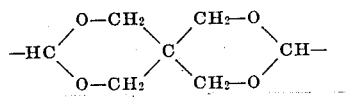

where the rings linked by the common spiro-carbon atom are counted as two members.

In order to obtain the sum $Z_g$, all members in the straight chain (that is to say including the ring members) are added. For the sum $Z_r$, only the ring members are added.

The condition for the quotient $Z_g/Z_r$ formulated above will be explained by means of the following table:

| Dicarboxylic Acid | Diol | $Z_g$ | $Z_r$ | $Z_g/Z_r$ |
| --- | --- | --- | --- | --- |
| Tetrahydrophthalic acid | Ethylene glycol | 7 | 1 | 7 |
| Phthalic acid | Ethylene glycol | 7 | 1 | 7 |
| Phthalic acid | Propane-1,2-diol | 7 | 1 | 7 |
| Hexahydrophthalic acid | Butanediol-1,4 | 9 | 1 | 9 |
| phthalic acid | Butanediol-1,4 | 9 | 1 | 9 |
| Hexahydrophthalic acid | Neopentyl glycol | 8 | 1 | 8 |
| Succinic acid | 1,1-bis(hydroxymethyl)-cyclohexane (METHYL)-cyclohexane | 9 | 1 | 9 |
| Tetrahydrophthalic acid | 1,1-bis(hydromethyl)cyclohexene-3 | 8 | 2 | 4 |
| Hexahydrophthalic acid | 2,2-bis-(p-hydroxycyclohexyl)propane | 8 | 3 | 2⅔ |

The dicarboxylic acid and the diol for the synthesis of the acid polyester must thus be so chosen as to fulfill the above conditions. Thus either the dicarboxylic acid or the diol or both must contain a ring, and further the aliphatic polymethylene chain in aliphatic dicarboxylic acids or diols must not be too long. A polyester of phthalic acid and dodecanediol ($Z_g=17$, $Z_r=1$, $Z_g/Z_r=17$) is therefore unsuitable for the purposes of the invention.

Furthermore, the molar ratio of the dicarboxylic acid to the dialcohol must be so chosen for the polycondensation that on average the recurring structural element (Ia) occurs at least twice and at most 10 times in the chain of the acid polyester (I), and that furthermore the resulting polyester possesses carboxyl groups at both ends of the chain.

The following may be mentioned as dicarboxylic acids containing at least one ring which can serve for the synthesis of the polyesters of formula (I): phthalic acid, isophthalic acid, terephthalic acid, tetrachlorophthalic acid, tetrahydrophthalic acid, hexahydrophthalic acid, 4-methylhexahydrophthalic acid, 3,6-endomethylene-tetrahydrophthalic acid, methyl-3,6-endomethylene-tetrahydrophthalic acid, 3,4,5,6,7,7-hexachlor-3,6-endomethylene-tetrahydrophthalic acid, dipheneacid, phenylene-diacetic acid, hydroquinone-0,0'-diacetic acid, diomethane-0,0'-diacetic acid; napthalenedicarboxylic acids.

To the extent that a diol containing at least one ring is chosen as a partner in the esterification, it is also possible to employ noncyclic dicarboxylic acids, for example oxalic acid, malonic acid, succinic acid, glutaric acid, adipic acid, allylsuccinic acid, dodecylsuccinic acid and dodecenylsuccinic acid.

As dialcohols which contain at least one ring and which can serve for the synthesis of the polyesters of formula (I), the following may be mentioned: 1,1-, 1,2-, 1,3- and 1,4-bis(hydroxymethyl)cyclohexane and the corresponding unsaturated cyclohexene derivatives, such as for example 1,1-bis-(hydroxymethyl)-cyclohexene-3 and 1,1-bis-(hydroxymethyl)-2,5-methylene-cyclohexene-3; hydrogenated diphenols such as cisquinitol, trans-quinitol, resorcitol, 1,2-dihydroxy-cyclohexane, bis(4-hydroxycyclohexyl)methane, 2,2-bis(4'-hydroxycyclohexyl)propane; tricyclo(5.2.1.0$^{2,6}$)decane-3,9- or -4,8-diol and adducts of glycols to diallylidene-pentaerythritol, for example 3,9-bis(hydroxyethoxyethyl)spirobi(metadioxane).

For the synthesis of the polyesters it is also possible to employ diphenols as diols, such as hydroquinone, resorcinol, pyrocatechol or diomethane (=2,2-bis(p-hydroxyphenyl)propane).

To the extent that a dicarboxylic acid containing at least one ring is chosen as a partner in the esterification, it is also possible to use noncyclic diols, for example ethylene glycol, 1,2-propanediol, 1,3-propanediol, 1,4-butanediol, 1,5-pentanediol, neopentyl glycol, 1,6-hexanediol, and hydroxy-pivalic acid neopentyl glycol diester.

In view of the above it is clear that long-chain dialcohols with for example more than 8 methylene groups can only be employed if the esterifying dicarboxylic acid contains an appropriate number of rings or more than one ring so that the condition according to which $Z_g/Z_r$ must not become greater than 13 remains fulfilled. The same is also correspondingly true for the use of long-chain dicarboxylic acids with, for example, more than 8 methylene groups: in order that the conditions for $Z_g/Z_r \leq 13$ shall be fulfilled, the diol must in such a case contain an appropriate number of rings.

It is of course also possible to use acid polyesters which are manufactured by condensation of a suitable dicarboxylic acid with a mixture of two or more suitable diols, or conversely by condensation of a suitable diol with a mixture of two or more suitable dicarboxylic acids in the correct mutual stoichiometric quantity ratio. Of course acid polyesters can also be manufactured by condensation of mixtures of different dicarboxylic acids with mixtures of different diols, always provided that the conditions postulated above for the quotient $Z_pZ_r$ and the total number of structural elements in the polyester chain remain observed.

As anhydride curing agents (2), polycarboxylic acid anhydrides with at least one carbocyclic ring are used. Such curing agents are for example cycloaliphatic polycarboxylic acid anhydrides, such as $\Delta^4$-tetrahydrophthalic anhydride, 4-methyl-$\Delta^4$-tetrahydrophthalic anhydride, hexahydrophthalic anhydride, 4-methylhexahydrophthalic anhydride, 3,6-endomethylene-$\Delta^4$-tetrahydrophthalic anhydride (=nadicanhydride), 4-methyl-3,6-endomethylene-$\Delta^4$-tetrahydrophthalic anhydride (=methylnadicanhydride); 3,4,5,6,7,7-hexachlor-3,6-endomethylene-tetrahydrophthalic anhydride (=chlorendic acid anhydride) and the Diels-Alder adduct of 2 mols of maleic anhydride and 1 mol of 1,4-bis-(cyclopentadienyl)-2-butene, or aromatic polycarboxylic acid anhydrides such as phthalic anhydride, trimellitic anhydride or pyromellitic dianhydride.

It is particularly advantageous to use cycloaliphatic dicarboxylic acid anhydrides such as for example $\Delta^4$-tetrahydrophthalic anhydride or hexahydrophthalic anhydride, which yield moulded materials having particularly good electrical properties.

The curable mixtures according to the invention can furthermore be mixed, in any stage before curing, with usual modifiers such as extenders, fillers and reinforcing agents, pigments, dyestuffs, organic solvents, plasticisers, flow control agents, agents for conferring thixotropy, flameproofing substances or mould release agents.

As extenders, reinforcing agents, fillers and pigments which can be employed in the curable mixtures according to the invention, the following may for example be mentioned: textile fibers, glass fibers, boron fibers, carbon fibers, cellulose, polyethylene powder, polypropylene powder, mica, asbestos, quartz powder, slate powder, aluminum oxide trihydrate, chalk powder, gypsum, antimony trioxide, bentones, silica aerogel ("AEROSIL"), lithopone, baryte, titanium dioxide, carbon black, graphite, iron oxide or metal powders such as aluminum powder or iron powder.

Suitable organic solvents for the modification of the curable mixtures are for example toluene, xylene, n-propanol, butyl acetate, acetone, methyl ethyl ketone, diacetone-alcohol, ethylene glycol monomethyl ether, monoethyl ether and monobutyl ether.

It is furthermore also possible to add other usual additives to the curable mixtures, for example flameproofing agents, agents for conferring thixotropy, flow control agents such as silicones, cellulose acetobutyrate, polyvinyl butyral, waxes, stearates and the like (these also being in part employed as mould release agents).

The curable mixtures can be manufactured in the usual manner with the aid of known mixing equipment (stirrers, kneaders, rolls and the like).

The curable epoxide resin mixtures are above all employed in the fields of surface protection, the electrical industry and laminating processes. They can be used, in each case in a formulation suited to the special end use, in the filled or unfilled state, optionally in the form of solutions, as stoving lacquers, sintering powders, compression moulding compositions, dipping resins, casting resins, injection moulding formulations, impregnating resins and adhesives, tool resins, laminating resins, and potting and insulating compositions for the electrical industry.

In the examples which follow parts denote parts by weight and percentages denote percentages by weight unless otherwise stated. The ratio of parts by volume to parts by weight is as of the milliliter to the gram.

The following acid polyesters were used for the manufacture of curable mixtures described in the examples:

MANUFACTURE OF POLYESTER A 760.6 g. of $\Delta^4$-tetrahydrophthalic anhydride and 248.5 g. of ethylene glycol (corresponding to a molar ratio of 5:4) were warmed to 175° C. under a nitrogen atmosphere. The mixture was further warmed to 210° C. over the course of 5 hours while stirring and the water produced by the polycondensation was continuously distilled off. Thereafter the mixture was cooled to 157° C. and subjected to a vacuum at 10 mm. Hg. for 30 minutes. At room temperature the acid polyester was a very viscous golden yellow mass with an acid equivalent weight of 464 (theory: 468).

MANUFACTURE OF POLYESTER B 815 g. of phthalic anhydride and 310 g. of ethylene glycol (corresponding to a molar ratio of 11:10) were warmed to 164° C. under a nitrogen atmosphere. The mixture was further warmed to 185° C. over the course of 10 hours while stirring and the water formed by the polycondensation was continuously distilled off. Thereafter the material was cooled to 140° C. and a vacuum of 9 mm. Hg was applied. The material was warmed to 160° C. over the course of 7 hours in vacuo. The acid polyester was a yellow glassy brittle mass with an acid equivalent weight of 932 (theory: 1035).

MANUFACTURE OF POLYESTER C 740.5 g. of phthalic anhydride and 304 g. of propanediol-(1,2) (molar ratio 5:4) were warmed to 166° C. under a nitrogen atmosphere. The mixture was further warmed to 182° C. over the course of 6½ hours while stirring and the water formed by the polycondensation was continuously distilled off. Thereafter the material was cooled to 145° C. and kept under a vacuum of 9 mm. Hg. at this temperature. The polyester was a light yellow glassy brittle mass having an acid equivalent weight of 461 (theory: 486).

MANUFACTURE OF POLYESTER D 770.5 g. of hexahydrophthalic anhydride together with 360.5 g. of butanediol-(1,4) (molar ratio 5:4) were warmed to 200° C. under a nitrogen atmosphere and kept for 9 hours at this temperature while stirring, with the water forming as a result of the polycondensation being continuously distilled off. The mixture was subsequently cooled to 142° C. and subjected to a vacuum (11 mm. Hg). The material was warmed to 160° C. in vacuo over the course of 1 hour. The reaction product was a yellow mass of honeylike consistency and had an acid equivalent weight of 502 (theory: 530).

MANUFACTURE OF POLYESTER E 740.5 g. of phthalic anhydride and 360.5 g. of butanediol-(1,4) (molar ratio 5:4) were warmed to 125° C. under a nitrogen atmosphere. The mixture was further warmed to 174° C. over the course of 7 hours while stirring and the water formed as a result of the polycondensation was continuously distilled off. Thereafter the material was cooled to 132° C. and subjected to a vacuum down to 15 mm. Hg. The mixture was warmed to 154° C. over the course of 1 hour and the pressure simultaneously lowered to 10 mm. Hg. The polyester was a brown viscous mass with an acid equivalent weight of 470 (theory: 514).

MANUFACTURE OF POLYESTER F 2,158 g. of hexahydrophthalic anhydride and 946 g. of butane- diol-(1,4) (molar ratio 4:3) were warmed to 160° C. under a nitrogen atmosphere, and warmed to 190° C. over the course of 6 hours while stirring, and the water forming as a result of the polycondensation continuously distilled off. After a further 5 hours at 190° C. the mixture was cooled to 170° C. and subjected to a vacuum of 12 mm. Hg. The material was warmed to 185° C. over the course of 1 hour under this vacuum. The acid polyester was a light yellow very viscous liquid with an acid equivalent weight of 452 (theory: 411).

MANUFACTURE OF POLYESTER G 616 g. (4 mols) of hexahydrophthalic anhydride and 312 g. (3 mols) of neopentyl glycol were mixed in a sulfonation flask provided with a descending condenser and heated to 100° C. In the course of this an exothermic reaction started (temperature rise to 186° C.). The reaction mixture was then cooled to 150° C. and allowed to react for 20 hours under nitrogen at this temperature. The water separation had then ended. Thereafter the mixture was allowed to react for a further 8 hours at 150° C. under a waterpump vacuum, whereby a light yellow acid polyester of acid equivalent weight 420 (theory: 446), which solidified in a glasslike manner at room temperature, was obtained.

MANUFACTURE OF POLYESTER H 590 g. (5 mols) of succinic acid and 576 g. (4 mols) of 1,1-bis-(hydroxymethyl)-cyclohexane were mixed in a sulfonation flask provided with a descending condenser and heated to 130° C. under nitrogen. In the course of this an exothermic reaction started and the reaction mixture became heated to 170° C. It was then allowed to react for 4 hours at 170° C., 3 hours at 190° C. under normal conditions and 2 hours at 175° C. under a waterpump vacuum. A light yellow highly viscous resin of acid equivalent weight 533 (theory: 511) resulted.

MANUFACTURE OF POLYESTER I 760.8 g. (5 mols) of tetrahydrophthalic anhydride and 568.8 g. (4 mols) of 1,1-bis(hydroxymethyl)-cyclohexene-3 were heated to 180° C. for 16 hours under nitrogen in a sulfonation flask provided with a descending condenser, while stirring. The elimination of water was then complete. The mixture was then allowed to react for a further 6 hours at 180° C. under a waterpump vacuum. A light yellow acid polyester with an acid equivalent weight of 901, which solidified in a glasslike manner at room temperature, was thereby obtained.

MANUFACTURE OF POLYESTER K 493.2 g. (3.2 mols) of hexahydrophthalic anhydride were mixed with 576.0 g. (2.4 mols) of hydrogenated bisphenol A (2,2-bis-(p-hydroxycyclohexyl)propane) [corresponding to a molar ratio of anhydride to diol of 4:3] and heated to 170° C. under nitrogen and while stirring. The temperature was then raised to 180° C. over the course of 4 hours and to 200 ° C. over the course of a further 24 hours. For the last 3 hours of the reaction time, the reaction was allowed to take place under a waterpump vacuum. The resulting polyester is a glasslike product at room temperature, with an acid equivalent weight of 620 (theory 641).

EXAMPLE 1 a. 161 g. of the cycloaliphatic diepoxide compound of formula

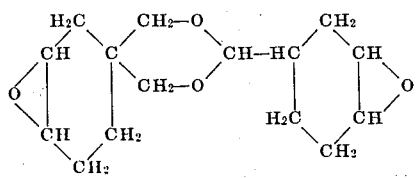

(=3,4-epoxytetrahydrobenzal-3',4'-epoxycyclohexane-1,1'-dimethanol), which is liquid at room temperature and has an epoxide content of 6.2 epoxide equivalents/kg. (epoxide resin A) were warmed to 110° C. with 210 g. of polyester A and 77 g. of hexahydrophthalic anhydride (corresponding to 0.5 mols of anhydride and 0.45 equivalents of acid ester per 1.0 equivalent of diepoxide compound) and were well stirred after the addition of 3 g. of 2-ethyl-4-methylimidazole. After a short vacuum treatment to remove the air bubbles, the mixture was poured into prewarmed aluminum moulds, with sheets of 135×135×mm. being manufactured for the determination of flexural strength, deflection, impact strength and heat distortion point, the appropriate test specimens being machined from these sheets. For the determination of the dielectric loss factor sheets of the same dimension but with a thickness of 3 mm. were manufactured. For the tensile test, test specimens according to DIN 16,946 and DIN 53,445, sample shape 2, 4 mm. were manufactured. After a heat treatment of 16 hours at 140° C. the following properties were measured on the mouldings:

| | |
|---|---|
| flexural strength according to VSM 77,103 | =12.2 kg./mm.² |
| deflection according to VSM 77,103 | =4.7 mm. |
| impact strength according to VSM 77,105 | =8 cm.kg./cm.² |
| heat distortion point according to ISO R 75 | =85° C. | dielectric loss factor tgσ (50 cycles) according to VSM 77,108 at
20° C.=0.009
100° C.=0.033
150° C.=0.057

In an identical mix, the volume change was measured during the cure by the capillary method.

78.5 percent of the total shrinkage occurred up to gelling, while in a comparison experiment without the addition of polyester, that is to say with 1.0 equivalent of epoxide resin A and 1.0 mol of hexahydrophthalic anhydride, 52 percent of the total shrinkage was measured before gelling had taken place and 48 percent after gelling had taken place.

The low shrinkage of the resin mixture after gelling has taken place in particularly of considerable advantage for uses in the casting resin field, since considerably lesser shrinkage stresses develop during cure.

b. When using 0.5 mols of tetrahydrophthalic anhydride instead of the corresponding amount of hexahydrophthalic anhydride, and otherwise the same composition and processing as in example 1a, the following properties were measured:

| | |
|---|---|
| flexural strength according to VSM 77,103 | =11.6 kg./mm.² |
| impact strength according to VSM 77,105 | =15.9 cm.kg./cm.² |
| heat distortion point according to ISO R 75 | =91° C. |
| tensile strength according to DIN 53,445 | =600 kp./cm.² |
| elongation at break according to DIN 53,445 | =5% | c. When using 0.6 mols of hexahydrophthalic anhydride (instead of 0.5) and 0.4 equivalents of polyester (instead of 0.45) and otherwise the same composition and processing as in example 1a, the following properties were measured:

| | |
|---|---|
| flexural strength (VSM) | =13.6 kg./mm.² |
| impact strength (VSM) | =16 cm.kg./cm.² |
| tensile strength (DIN) | =770 kp./cm.² |
| elongation at break (DIN) | =10% |
| heat distortion point (ISO R75) | =96° C. | d. When using 0.65 mols of anhydride (instead of 0.5) and 0.35 equivalents of polyester (instead of 0.45) and otherwise the same composition and processing as in example 1a, the following properties were measured:

| | |
|---|---|
| flexural strength (VSM) | =12.3 kg./mm.² |
| impact strength (VSM) | =11.7 cm.kg./cm.² |
| tensile strength (DIN) | =730 kp./cm.² |
| elongation at break (DIN) | =9% |
| heat distortion point (ISO R75) | =112° C. | e. When using 0.6 mols of methylnadicanhydride instead of the equimolar amount of hexahydrophthalic anhydride, and otherwise the same composition and processing as in example 1a, the following properties were measured:

3,624,180

| | |
|---|---|
| flexural strength (VSM) | =12.9 kg./mm.² |
| deflection (VSM) | =5 mm. |
| impact strength (VSM) | =16 cm.kg./cm.² |
| tensile strength (DIN) | =600 kp./cm.² |
| elongation at break (DIN) | =5% |
| heat distortion point (ISO R75) | =100° C. | dielectric loss factor tg σ (50 cycles) at
20° C.=0.006
60° C.=0.007
100° C.=0.021
130° C.=0.046

EXAMPLE 2 a. 101.5 g. of triglycidyl isocyanurate with an epoxide content of 9.85 epoxide equivalents per kg. (epoxide resin B) were warmed with 186 g. of polyester A to the point that a homogeneous melt formed while stirring. After adding 92.5 g. of hexahydrophthalic anhydride (corresponding to 0.6 mols of anhydride and 0.4 equivalents of acid polyester per 1.0 equivalent of epoxide compound) the mixture was well stirred at 110° C. and after a short vacuum treatment was poured into the prewarmed moulds according to example 1. The heat treatment of 16 hours at 140° C. yielded mouldings with the following properties:

| | |
|---|---|
| flexural strength (VSM) | =16.4 kg./mm.² |
| deflection (VSM) | =11.4 mm. |
| impact strength (VSM) | =18.7 cm.kg./cm.² |
| tensile strength (DIN) =960 kp./cm.² | |
| elongation at break (DIN) | =8% |
| heat distortion point (ISO R 75) | =86° C. | dielectric loss factor tg. σ(50 cycles) at
20° C.=0.006
60° C.=0.007
100° C.=0.004
130° C.=0.053 b. When using 1.0 equivalent of the N,N'-diglycidyl compound of the following structure

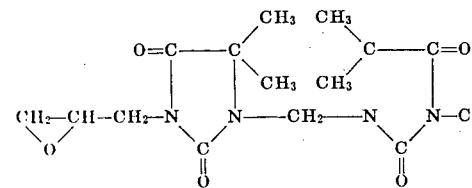

with an epoxide content of 5.2 epoxide equivalents per kg. (epoxide resin C) and otherwise the same composition and curing as in example 2a, the following properties were measured:

| | |
|---|---|
| flexural strength (VSM) | =13.8 kg./mm.² |
| impact strength (VSM) | =20 cm.kg./cm.² |
| water absorption after 24 hours, 20° C. | =0.14% |
| tensile strength (DIN) | =680 kp./cm.² |
| elongation at break (DIN) | =4% |
| heat distortion point (ISO R 75) | =79° C. | dielectric loss factor tg σ (50 cycles) at
20° C.=0.004
60° C.=0.008
100° C.=0.064
130° C.=0.039

EXAMPLE 3

161 g. of epoxide resin A (1.0 equivalent) were well mixed at 110° C. with 280 g. of polyester B (0.3 equivalents), 100 g. of hexahydrophthalic anhydride (0.65 equivalents) and 1 g. of benzyldimethylamine, and after a short vacuum treatment the mixture was poured into the moulds according to example 1a. After a heat treatment of 16 hours at 140° C. the following properties were measured on the mouldings:

| | |
|---|---|
| flexural strength (VSM) | =11.3 kg./mm.² |
| deflection (VSM) | =6.1 mm. |
| impact strength (VSM) | =10.6 cm.kg./cm.² |
| tensile strength (DIN) | =640 kp./cm.² |
| elongation at break (DIN) | =5% |
| heat distortion point (ISO R 75) | =87° C. |

EXAMPLE 4 a. 161 g. of epoxide resin A (1.0 equivalents) were well mixed at 110° C. with 92.5 g. of hexahydrophthalic anhydride (0.6 equivalents), 184 g. of polyester C (0.4 equivalents) and 3 g. of a 6 percent strength solution of the sodium alcoholate of 3-hydroxymethyl-2,4-dihydroxy-pentane (subsequently referred to as "sodium hexylate" for brevity) in 3hydroxymethyl-2,4-dihydroxypentane (subsequently referred to as "-hexanetriol" for brevity), and after a short vacuum treatment the mixture was poured into the moulds according to example 1a. After a heat treatment of 16 hours at 140° C. the following properties were measured on the mouldings:

| | |
|---|---|
| flexural strength (VSM) | =10.9 kg./mm.² |
| deflection (VSM) | =6.2 mm. |
| impact strength (VSM) =9.1 cm.kg./cm.² | |
| heat distortion point (ISO R75) | =120° C. | dielectric loss factor tg σ (50 cycles) at
20° C.=0.003
60° C.=0.003
100° C.=0.012
130° C.=0.039 b. When using 185 g. (1.0 equivalent of a bisphenol-A diglycidyl ether manufactured by condensation of epichlorhydrin with bis(p-hydroxyphenyl)-dimethylmethane in the presence of alkali, which is liquid at room temperature and has an epoxide content of 5.35 epoxide equivalents/kg. (epoxide resin D), in place of 1.0 equivalent of epoxide resin A, and otherwise the same composition and cure as in example 4a, the following properties were measured:

| | |
|---|---|
| flexural strength (VSM) | =15.6 kg./mm.² |
| deflection (VSM) | =9.8 mm. |
| impact strength (VSM) | =17.4 cm.kg./cm.² |
| elongation at break (DIN) | =860 kp./cm.² | dielectric loss factor tg σ (50 cycles) at
20° C.=0.0002
60° C.=0.003
90° C.=0.08 c. When using 400 g. (1.0 equivalent) of a bisphenol-A diglycidyl ether manufactured by condensation of epichlorhydrin with bis(p-hydroxyphenyl)-dimethylmethane in the presence of alkali, which is solid at room temperature and has an epoxide content of 2.5 epoxide equivalents/kg. (epoxide resin E) instead of 1.0 equivalent of epoxide resin A, and otherwise the same composition and processing as in example 4a, the following properties were obtained:

| | |
|---|---|
| flexural strength (VSM) | =13.8 kg./mm.² |
| deflection (VSM) | =11.5 mm. |
| impact strength (VSM) | =20 cm.kg./cm.² |
| tensile strength (DIN) | =850 kp./cm.² |
| elongation at break (DIN) | =5% |
| heat distortion point (ISO R 75) | =78° C. | dielectric loss factor tg σ (50 cycles) at
20° C.=0.003
α° C.=0.003
90° C.=0.08

EXAMPLE 5

161 g. (1.0 equivalent) of epoxide resin A were warmed to 110° C. with 226 g. of polyester D (0.45 equivalents) and 77 g. of hexahydrophthalic anhydride (0.5 equivalents) and after addition of 3 g. of 2-ethyl-4-methylimidazole the material was well mixed, subjected to a vacuum and poured into the prewarmed moulds according to example 1a. After a heat treatment of 16 hours at 140° C. the following properties were measured on the mouldings.

| | |
|---|---|
| flexural strength (VSM) | =14 kg./mm.² |
| deflection (VSM) | =8.4 mm. |
| impact strength (VSM) | =16 cm.kg./cm.² |
| tensile strength (DIN) | =740 kp./cm.² |
| elongation at break (DIN) | =7% |
| heat distortion point (ISO R 75) | =80° C. |

EXAMPLE 6

89 g. (0.6 equivalents) of phthalic anhydride and 188 g. (0.4 equivalents) of polyester E were warmed to 120° C. and stirred at this temperature until a homogeneous mixture had formed. Thereafter 161 g. (0.1 equivalents) of epoxide resin A and 3 g. of a 6 percent strength solution of "sodium hexylate" in "hexanetriol" were added and the material well mixed at 110° C. The mixture was subjected to a vacuum and poured into the prewarmed moulds according to example 1a. After a heat treatment of 16 hours at 140° C. the following properties were measured on the mouldings:

| | |
|---|---|
| flexural strength (VSM) | 10.5 kg./mm.² |
| deflection (VSM) | 6.3 mm. |
| impact strength (VSM) | 10 cm.kg./cm.² |
| tensile strength (DIN) | 570 kp./mm.² |
| heat distortion point (ISO) | 94° C. |

EXAMPLE 7 a. 161 g. (1.0 equivalent) of epoxide resin A were warmed to 110° C. with 184 g. (0.4 equivalents) of polyester F, 77 g. (0.5 equivalents) of hexahydrophthalic anhydride and 3 g. of 2-ethyl-4-methyl-imidazole, and well mixed. The mixture was subjected to a vacuum and poured into the prewarmed moulds according to example 1a. After a heat treatment of 16 hours at 140° C. the following properties were measured on the mouldings:

| | |
|---|---|
| flexural strength (VSM) | =11.9 kg./mm.² |
| deflection (VSM) | =7.5% |
| impact strength (VSM) | =16.5 cm.kg./cm.² |
| tensile strength (DIN) | =830 kp./cm.² |
| elongation at break (DIN) | =7% |
| heat distortion point (ISO) | =97° C. | b. When using 0.5 equivalents of tetrahydrophthalic anhydride instead of the equimolar amount of hexahydrophthalic anhydride, and otherwise the same composition and processing as in example 7a, the following properties were measured:

| | |
|---|---|
| flexural strength (VSM) | =11.6 kg./mm.² |
| impact strength (VSM) | =15 cm.kg./cm.² |
| tensile strength (DIN) | =600 kp./cm.² |
| elongation at break (DIN) | =5% |
| heat distortion point (ISO) | =91° C. | c. When using 0.6 equivalents of anhydride and 0.4 equivalents of acid polyester (instead of 0.5 and 0.4 equivalents) and otherwise the same composition and processing as in example 7a, the following properties were measured:

| | |
|---|---|
| flexural strength (VSM) | =13.4 kg./mm.² |
| deflection (VSM) | =7.6 mm. |
| impact strength (VSM) | =18.7 cm.kg./cm.² |
| tensile strength (DIN) | =770 kp./cm.² |
| elongation at break (DIN) | =9.3% |
| heat distortion point (ISO) | =106° C. | dielectric loss factor tg σ (50 cycles) at
20° C.=0.004
60° C.=0.007
100° C.=0.018
130° C.=0.037 d. When using 177 g. (1.1 equivalents) of epoxide resin A and adding 108 g. (0.1 equivalents) of an acid sebacic acid-neopentyl glycol polyester having an acid equivalent weight of 1,080, and otherwise using the same composition and processing as under 7a, milky-cloudy mouldings with the following properties were obtained:

| | |
|---|---|
| limiting flexural stress (VSM) | =7.2 kg./mm.² |
| deflection (VSM) | =20 mm. |
| impact strength (VSM) | =25 cm.kg./cm.² |
| tensile strength (DIN) | =633 kp./cm.² |
| elongation at break (DIN) | =9% |
| heat distortion point (ISO) | =73° C. |

The manufacture of milky-cloudy, highly impact-resistant and flexible articles can be of interest for the manufacture of certain moulded articles such as compression-moulding compositions, decorative sheets, and fluidized bed sintering powders.

e. When using 64 g. (0.2 equivalents) of an adduct of 100 parts by weight of epoxide resin A and 100 parts by weight of an acid polyester from 4 equivalents of dimeric fatty acid (EMPOL 1014) and 3 equivalents of hexanediol-1,6, and 0.8 equivalents of epoxide resin A, instead of 1.0 equivalent of epoxide resin A, and otherwise the same composition and processing as in example 7c, light, mat (opaque) mouldings with the following properties were obtained:

| | |
|---|---|
| flexural strength (VSM) | =10.8 kg./cm.² |
| deflection (VSM) | =7.1 mm. |
| impact strength (VSM) | =16.5 cm.kg./cm.² |
| tensile strength (DIN) | =711 kp./cm.² |
| elongation at break (DIN) | =9.3% |
| heat distortion point (ISO) | =91° C. | dielectric loss factor tg σ (50 cycles) at
20° C.=0.007
60° C.=0.013
100° C.=0.017
130° C.=0.037

EXAMPLE 8 a. 139 g. (1.0 equivalent) of the cycloaliphatic diepoxide compound of formula

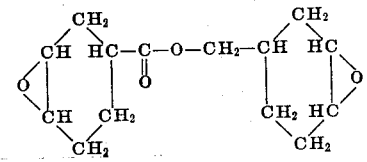

(3',4'-epoxycyclohexylmethyl-3,4-epoxycyclohexanecarboxylate), which is liquid at room temperature and has an epoxide content of 7.1 epoxide equivalents/kg. (epoxide resin F) were well mixed with 168 g. of polyester G (=0.4 equivalent), 92.5 g. (=0.6 equivalent) of hexahydrophthalic anhydride and 3 g. of a 6 percent strength solution of "sodium hexylate" in "hexanetriol" at 110° C., subjected to a vacuum and poured into the moulds according to example 1a. After a heat treatment of 16 hours at 140° C. the following properties were measured:

| | |
|---|---|
| flexural strength (VSM) | =10.9 kg./mm.² |
| deflection (VSM) | =6 mm. |
| impact strength (VSM) | =10.7 cm.kg./cm.² |
| tensile strength (DIN) | =630 kp./cm.² |
| elongation at break (DIN) | =7.5% |
| heat distortion point (ISO) | =88° C. | b. When using 161 g. (1.0 equivalent) of epoxide resin A instead of epoxide resin F and otherwise the same composition and processing as in example 8a, the following properties were measured:

| | |
|---|---|
| flexural strength (VSM) | =11.2 kg./mm.² |
| impact strength (VSM) | =11.2 cm.kg./cm.² |
| tensile strength (DIN) | =680 kp./cm.² |
| elongation at break (DIN) | =4% |
| heat distortion point (ISO) | =120° C. |

EXAMPLE 9

161 g. (1.0 equivalent) of expoxide resin A were well mixed with 187 g. (0.35 equivalent) of polyester H, 92.5 g. (0.6 equivalent) of hexahydrophthalic anhydride and 3 g. of 2-ethyl-4-methyl-imidazole at 110° C., subjected to a vacuum and poured into the prewarmed moulds according to example 1a. After a heat treatment of 16 hours at 140° C. the following properties were measured on the mouldings:

| | |
|---|---|
| flexural strength (VSM) | =13.4 kg./mm.² |
| deflection (VSM) | =6.4 mm. |
| impact strength (VSM) | =16.4 cm.kp./cm.² |
| tensile strength (DIN) | 745 kp./cm.² |
| elongation at break (D I) | =9% |
| heat distortion point (I D) | =96° C. |

EXAMPLE 10

185 g. (1.0 equivalent) of epoxide resin D were well mixed with 360 g. of polyester I (0.4 equivalent), 92.5 g. (0.6 equivalent) of hexahydrophthalic anhydride and 3 g. of a 6 percent strength solution of "sodium hexylate" in "hexanetriol" at 110° C., subjected to a vacuum and poured into the prewarmed moulds according to example 1. After a heat treatment of 16 hours at 140° C. the following properties were measured on the mouldings:

| | |
|---|---|
| flexural strength (VSM) | =12.3 kg./mm.² |
| deflection (VSM) | =7.5 mm. |
| impact strength (VSM) | =15 cm.kg./cm.² |
| tensile strength (DIN) | =590 kp./cm.² |
| elongation at break (DIN) | =4.7% |
| heat distortion point (ISO) | =65° C. |
| Water absorption after 25 hours at 20° C. | =0.04% | dielectric loss factor tg σ (50 cycles) at
20° C. =0.003
60+ C. =0.006
90° C. =0.094
110° C. =0.018

EXAMPLE 11 a. 248 g. (0.4 equivalent) of polyester K were warmed to 130° C. and mixed with 92.5 g. (0.6 equivalent) of hexahydrophthalic anhydride. Thereafter 161 g. (0.1 equivalents) of epoxide resin A and 3 g. of a 6 percent strength solution of "sodium hexylate" in "hexanetriol" were added at 120° C. and the material was well mixed and poured into the prewarmed moulds according to example 1a after being briefly subjected to a vacuum. After a heat treatment, mouldings with the following properties were obtained:

| | |
|---|---|
| flexural strength (VSM) | =2.9 kg./mm. |
| impact strength (VSM) | =2.6 cm.kg./cm.² |
| water absorption after 24 hours/20° C. | =0.17% |
| heat distortion point (ISO) R 75 | =159° C. | dielectric loss factor tg σ (50 cycles) at
20° C.=0.005
60° C.=0.003
100° C.=0.002
140° C.=0.003
170° C.=0.017 tracking resistance (VDE0303) =KA3b b. When using 1.0 equivalent (155 g.) of a Δ⁴-tetrahydrophthalic acid diglycicyl ester with an epoxide content of 6.45 epoxide equivalents/kg. (epoxide resin G) instead of epoxide resin A, and otherwise the same processing and composition as in example 11a), mouldings with the following properties were obtained:

| | |
|---|---|
| flexural strength (VSM) | =11.1 kg./mm.² |
| impact strength (VSM) | =13.4 cm.kg./cm.² |
| tensile strength (VSM) | =6.3 kg./mm.² |
| water absorption after 24 hours/20° C. | =0.14% |
| heat distortion point (ISO R 75) | =96° C. | dielectric loss factor tg σ (50 cycles) at
20° C.=0.0005
60° C.=0.004
100° C.=0.032
140° C.=0.038
tracking resistance (VDE 0303)    =KA3c c. When using 1.0 equivalent (159 g.) of a hexahydrophthalic acid diglycidyl ester with an epoxide content of 6.3 epoxide equivalents/kg. (epoxide resin H) instead of epoxide resin A, and otherwise the same processing and composition as in example 11a), mouldings with the following properties were obtained:

| | |
|---|---|
| flexural strength (VSM) | =9.2 kg./mm.² |
| impact strength (VSM) | =11.2 cm.kg./cm.² |
| water absorption after 24 hours/24° C. | =0.17% |
| heat distortion point (ISO R 75) | =96° C. |
| tensile shear strength (VSM) | =4.1 kg./mm.² | dielectric loss factor tg σ (50 cycles) at
20° C.=0.005
60° C.=0.004
100° C.=0.020
140° C.=0.038
tracking resistance (VDE 0303)    =KA3c d. When using 159.9 g. (1.0 equivalent) of a Δ⁴-tetrahydrophthalic acid di-(β-methylglycidyl) ester with an epoxide content of 6.26 (epoxide equivalents/kg. (epoxide resin G) instead of epoxide resin A, and otherwise the same composition and processing as in example 11a), mouldings with the following properties were obtained:

| | |
|---|---|
| flexural strength (VSM) | =7.3 kg./mm.² |
| impact strength (VSM) | =6.7 cm.kg./cm.² |
| water absorption after 24 hours/20° C. | =0.11% | dielectric loss factor tgσ (50 cycles) at
20° C.=0.005
60° C.=0.022
100° C.=0.070
125° C.=0.016
tracking resistance (VDE 0303) =KA3b

We claim:

1. A heat-curable composition of matter, which comprises (1) a polyepoxide with at least one carbocyclic or heterocyclic ring; (2) a polycarboxylic acid anhydride with at least one carbocyclic ring in an amount of 0.8 to 0.2 equivalent per 1 epoxide equivalent of the polyepoxide compound (1), and (3) an acid polyester, containing in its structure carbocycles or heterocycles, of formula

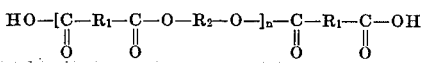

in an amount of 0.2 to 0.8 equivalent per 1 epoxide equivalent of the polyepoxide compound (1), wherein, in the formula, the symbols $R_1$ and $R_2$ in the recurring structural element denote divalent aliphatic, araliphatic, cycloaliphatic, cycloaliphatic-aliphatic, aromatic or heterocyclic residues, with the proviso that at least one of the two residues $R_1$ and $R_2$ must contain a carbocycle or heterocycle, wherein n denotes an integer having a value of 2 to 10 and wherein, further, the quotient $Z_u/Z_r$ in the recurring structural element of formula

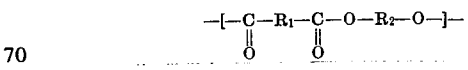

has a value of 2 to 13, $Z_u$ denotes the total number of members in the straight chain of the structural element and $Z_r$ denotes the number of members of the structural element consisting of a cycle with the former members $Z_g$ being selected from the following group:

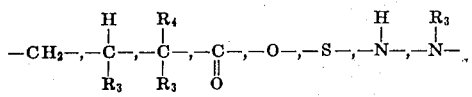

($R_3$ and $R_4$ each denote an alkenyl group or alkenyl group), alicycle, heterocycle and aromatic cycle with the proviso that a cycle in which two rings are linked by a common spiro-carbon atom is counted as two members.

2. A heat-curable composition of matter, which comprises (1) a polyepoxide with at least one carbocyclic or heterocyclic ring; (2) a polycarboxylic acid anhydride with at least one carbocyclic ring in an amount of 0.7 to 0.45 equivalent, per 1 epoxide equivalent of the polyepoxide compound (1), and (3) and acid polyester, containing in its structure carbocycles or heterocycles, of formula

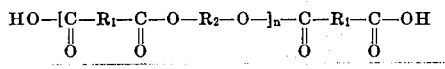

in an amount of 0.3 to 0.55 equivalent per 1 epoxide equivalent of the polyepoxide compound (1), wherein, in the formula, the symbols $R_1$ and $R_2$ in the recurring structural element denote divalent aliphatic, araliphatic, cycloaliphatic, cycloaliphatic-aliphatic, aromatic or heterocyclic residues, with the proviso that at least one of the two residues $R_1$ and $R_2$ must contain a carbocycle or heterocycle, wherein n denotes an integer having a value of 2 to 5, and wherein, further, the quotient $Z_g/Z_r$ in the recurring structural of formula

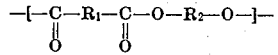

has a value of 4 to 10, $Z_g$ denotes the total number of members in the straight chain of the structural element and $Z_r$ denotes the number of members of the structural element consisting of a cycle, with the former members $Z_g$ being selected from the following group:

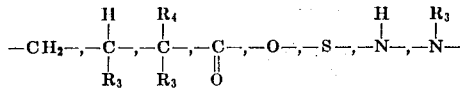

($R_3$ and $R_4$ each denote an alkyl group or alkenyl group), alicycle, heterocycle and aromatic cycle with the proviso that a cycle in which two rings are linked by a common spiro-carbon atom is counted as two members.

3. A composition according to claim 1, which contains a polyepoxide (1) which on curing with the carboxylic acid anhydride (2) alone yields a cured moulded material with a heat distortion point according to Martens DIN 53,458 of at least 148° C.

4. A composition according to claim 1, which contains a cycloaliphatic or heterocyclic polyepoxide.

5. A composition according to claim 4, which contains a diepoxide of formula

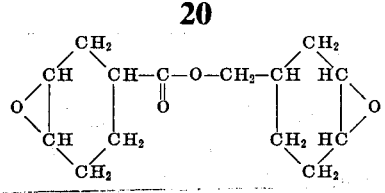

or of formula

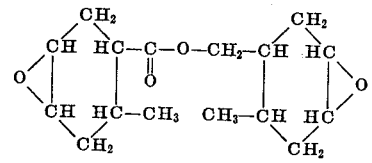

as the polyepoxide (1).

6. A composition according to claim 4, which contains a diepoxide of formula

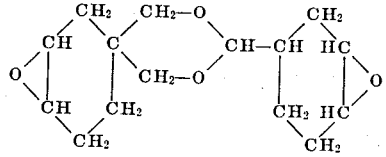

as the polyepoxide (1).

7. A composition according to claim 4, which contains triglycidyl isocyanurate as the polyepoxide (1).

8. A composition according to claim 4, which contains N,N'-diglycidyl-5,5-dimethyl-hydantoin as the polyepoxide (1).

9. A composition according to claim 4, which contains tetrahydrophthalic acid di-($\beta$-methylglycidyl) ester as the polyepoxide (1).

10. A composition according to claim 1, which contains a polycarboxylic acid anhydride (2) which on reaction with the polyepoxide compound (1) alone yields a cured moulded material with a heat distortion point according to Martens DIN 53,458 of at least 140° C.

11. A composition according to claim 1, which contains a cycloaliphatic polycarboxylic acid anhydride.

12. A composition according to claim 1, which contains an acid polyester (3) which is derived from tetrahydrophthalic acid or hexahydrophthalic acid. k 13. A composition according to claim 1, which contains an acid polyester (3) which is derived from phthalic acid.

14. A composition according to claim 1, which contains an acid polyester (3) which is derived from succinic acid.

15. A composition according to claim 1, which contains an acid polyester (3) which is derived from 1,1-bis(hydroxymethyl)cyclohexane or 1,1-bis(hydroxymethyl)-cyclohexene-3.

16. A composition according to claim 1, which contains an acid polyester (3) which is derived from 2,2-bis-(p-hydroxycyclohexyl)-propane.

17. A composition according to claim 1, which contains an acid polyester (3) which is derived from ethylene glycol, propanediol-1,2, propanediol-1,3,, butanediol-1,4 or neopentyl glycol.

* * * * *

UNITED STATES PATENT OFFICE
CERTIFICATE OF CORRECTION

Patent No. 3,624,180    Dated November 30, 1971

Inventor(s) ROLF SCHMID ET AL

It is certified that error appears in the above-identified patent and that said Letters Patent are hereby corrected as shown below:

Column 19, line 9, after "denote an", delete "alkenyl" and substitute --- alkyl ---.

Column 19, line 18, before "acid", delete "and" and substitute --- an ---.

Column 20, line 45, after "acid.", delete "k".

Signed and sealed this 27th day of June 1972.

(SEAL)
Attest:

EDWARD M. FLETCHER, JR.
Attesting Officer

ROBERT GOTTSCHALK
Commissioner of Patents